J. W. SMITH.
Bee Hive.
No. 37,363.
Patented Jan'y 6, 1863.
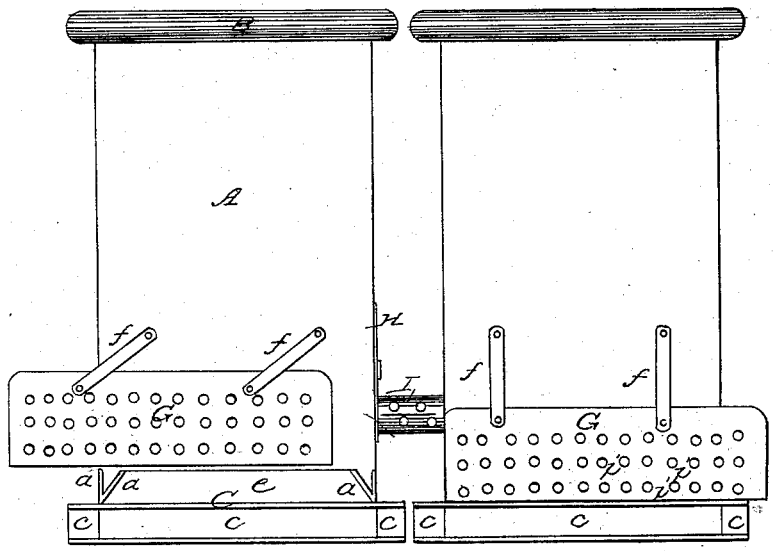
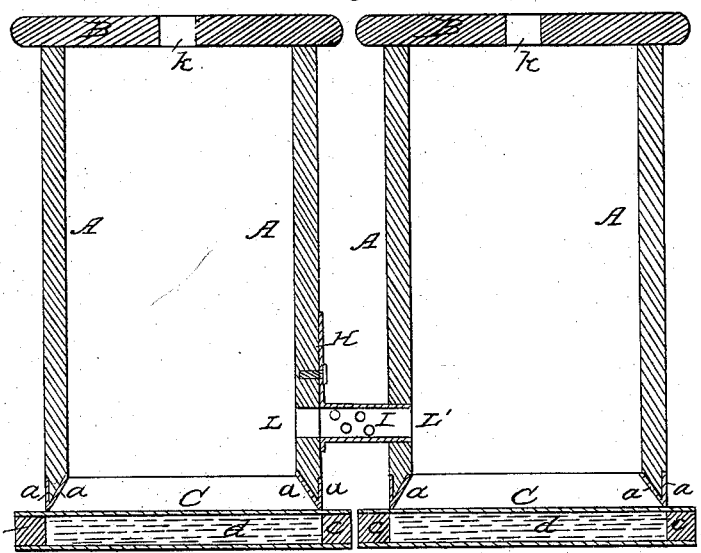

UNITED STATES PATENT OFFICE.

JOHN W. SMITH, OF IOWA POINT, KANSAS.

IMPROVEMENT IN BEE-HIVES.

Specification forming part of Letters Patent No. 37,363, da'ed January 6, 1863.

*To all whom it may concern:*

Be it known that I, JOHN W. SMITH, of Iowa Point, in the county of Doniphan and State of Kansas, have invented a certain new and useful Improvement in Bee-Hives, of which the following is a full, clear, and exact description, reference being had to the accompanying drawings, making part of this specification, in which—

Figure 1 represents a side elevation of two hives having my improvements applied thereto; and Fig. 2 a vertical section of the same, taken centrally through them.

The object of my invention is twofold: First, to prevent the breeding of the bee-moth and to destroy the worm should it be hatched; secondly, to adapt certain devices to the hives, by means of which the swarming of the bees may be so directed as to guide them into a new hive, without having to undergo the usual tedious and uncertain plan of hiving them after they have swarmed, as heretofore practiced.

To enable others skilled in the care of bees to make, construct, and use my improvements, I will now proceed to describe them in detail.

The bee-hive A, to which my improvements are represented as being applied in the drawings, consists of a plain rectangular box higher than it is wide, covered with a flat roof, B, the lower end of the hive being chamfered off on the inside and lined with zinc $a$, so as to leave no place for the bee-moths to deposit their eggs to be hatched, as may be seen by reference to Fig. 2. Thus constructed it is placed on the platform C, also covered on top and bottom with zinc plates, so that the hive, as it were, rests on a knife-edge and metallic contact, the least favorable conditions for the hatching of insect eggs. The platform C consists of two plates of sheet-zinc or other suitable metal, so arranged by the interposition of small strips $c$ of wood around their edges as to form a chamber, $d$, which is filled with salt to act, as it melts from the atmospheric moisture penetrating through the crevices along the edges of the wood and through the pores of the latter, as a refrigerant to keep the hive cool, thereby having a tendency to prevent the deposition and hatching of the moth-eggs. For this purpose one of the strips is pivoted in the middle, and so beveled off at the ends as to permit of being turned to charge the chamber $d$ with salt or other refrigerating agent, as required. Should the worms or caterpillars still be hatched the inside of the hive A is covered over with a thin coat of the red oxide of mercury mixed up to the consistency of a paste with beeswax, which, as the latter forms their natural food, they eat, and with it the red oxide of mercury, which effectually destroys them. The coolness of the metal platform C has the tendency of preventing the moths from lying around and consequent depositing of their eggs. In the front of the hive A is cut an opening, $e$, for the passage in and out of the bees, but in this case it is made wider than usual for the purposes of ventilation. Over this opening is arranged a perforated slide, G, mounted on, as in a parallel rule, two arms, $f$, by means of which it is raised and lowered, as required—that is to say, in ordinary times when the bees are working it is raised and kept sufficiently high to give free access in and exit out of the hive, the air being allowed to pass freely in above that space for the purposes of ventilation through the openings $i$ in the slide G, but when the bees show indications of swarming then the slide G is closed down to prevent their escape in that direction, and the revolving slide H on the side of the hive turned around until the tube I is in a line with the hole L, cut in that side of the hive, when the tube I is inserted into a corresponding opening, L', cut in the side of an empty hive, identical in all respects with the one just described. Through this channel the bees in their search for an outlet pass into the empty hive, the front opening of which is closed by the slide G, and also the corresponding side opening like that of the tube I. In this condition the two hives are kept until it is found that the young swarm are at work in their new quarters, when the two hives are separated, and the side avenues closed in both, through which they had communicated, by turning them around on their pivots, when the slide of the old hive may be opened to permit the bees again to work. The new hive is then removed a short distance, and after you are satisfied that the bees have fairly gone to work in their new home the front slide may be opened as in the other, thus avoiding the care and trouble experienced in the swarming and hiving of the bees by the old way. The avenue I is perforated with holes to admit air and light to the bees on their passage to the new hive. An opening, *k*, is also made in the center of the top cover or roof, B, of the hive, through which the bees may pass to a box or cap to be arranged there as a convenient way of taking the honey.

Having thus described my invention, what I claim as new, and desire to secure by Letters Patent, is—

1. A metallic platform, G, provided with a chamber, *d*, in which is placed salt, or its equivalent, for the purposes set forth.

2. In combination with the platform so constructed, the chamfered bee-hive covered with zinc or other metal, as described, for the purposes set forth.

3. Coating the inside of the hive with a mixture of the red oxide of mercury and beeswax, for the purpose described.

4. The combination of the perforated slide G with the avenue I, for the purposes described.

In testimony whereof I have signed my name to this specification before two subscribing witnesses.

JOHN W. SMITH.

Witnesses:
DANIEL F. MITCHEL,
THOS. R. MARKILLIE.